United States Patent [19]
Klingler

[11] Patent Number: 5,747,903
[45] Date of Patent: May 5, 1998

[54] MOTOR-GEAR DRIVE UNIT, PARTICULARLY FOR AN AUTOMOBILE WINDOW LIFTER DRIVE OR THE LIKE, IN WHICH A MOTOR-GEAR SHAFT IS MOUNTED

[75] Inventor: Peter Klingler, Neubrunn, Germany

[73] Assignee: Siemens Aktiengesellschaft, Munich, Germany

[21] Appl. No.: 701,956

[22] Filed: Aug. 23, 1996

[30] Foreign Application Priority Data

Aug. 25, 1995 [DE] Germany .................. 295 13 700 U

[51] Int. Cl.$^6$ ................... H02K 7/116; E04F 15/10
[52] U.S. Cl. ............ 310/75 R; 310/83; 310/89; 310/90; 310/43
[58] Field of Search ................... 310/83, 75 R, 310/90, 89, 43, 96, 98, 99; 384/215, 220, 222, 439; 16/2.1

[56] References Cited

U.S. PATENT DOCUMENTS

| | | | |
|---|---|---|---|
| 4,227,104 | 10/1980 | Hamman | 310/75 R |
| 4,623,810 | 11/1986 | Smith | 310/90 |
| 4,920,289 | 4/1990 | Saito | 310/90 |
| 5,053,661 | 10/1991 | Kitamura et al. | 310/83 |
| 5,325,736 | 7/1994 | Tsujita | 310/90 |
| 5,405,199 | 4/1995 | Mabuchi et al. | 310/90 |
| 5,414,316 | 5/1995 | Michel et al. | 310/90 |
| 5,494,356 | 2/1996 | Strobl | 310/90 |

FOREIGN PATENT DOCUMENTS

| | | | |
|---|---|---|---|
| 0608452 | 10/1994 | European Pat. Off. | |
| 1919444 | 12/1964 | Germany | |
| 2729398 | 1/1979 | Germany | |
| 2750477 | 5/1979 | Germany | 310/83 |
| 2809390 | 9/1979 | Germany | 310/83 |
| 8128186.2 | 6/1982 | Germany | |
| 4039453 | 6/1992 | Germany | |
| 4210302 | 9/1993 | Germany | |
| 9315382 | 3/1995 | Germany | |
| 1596374 | 8/1981 | United Kingdom | |

Primary Examiner—Thomas M. Dougherty
Assistant Examiner—B. Mullins
Attorney, Agent, or Firm—Sughrue, Mion, Zinn, Macpeak & Seas, PLLC

[57] ABSTRACT

To reduce the outlay in terms of manufacture and assembly, a motor-gear drive unit is provided, which includes a motor housing and adjoining gear case, and in which:

a) a motor-gear shaft (3) is mounted in the motor housing (1) in a first bearing, preferably a cup bearing (7);

b) the motor-gear shaft (3) is mounted in the gear case (2) in a second bearing in the form of a preferably metallic, cylindrical bearing (8);

c) the gear case (2) consists of a plastic part with an axially loadable bearing orifice (2.3) having circumferentially radially projecting shaped webs (2.31) for receiving the cylindrical bearing (8); and d) the cylindrical bearing (8) is pressed into the bearing receptacle (2.3) axially in bearing contact with a press fit relative to the shaped webs (2.31).

18 Claims, 3 Drawing Sheets

MOTOR-GEAR DRIVE UNIT, PARTICULARLY FOR AN AUTOMOBILE WINDOW LIFTER DRIVE OR THE LIKE, IN WHICH A MOTOR-GEAR SHAFT IS MOUNTED

FIELD OF AND BACKGROUND OF THE INVENTION

The invention relates to a motor-gear drive unit, and, more particularly, to a drive unit for an automobile window lifter, a sunroof, or the like. The subject matter of the invention further involves a motor-gear shaft mounted in a motor housing and in a gear case.

A motor-gear drive unit having a motor-shaft mounted in a motor housing and a gear case is known from DE-GM-81 28 186.2. According to the abovementioned reference, a cup bearing is provided as each bearing for the motor-gear shaft.

EP-0 608 452 (B1) discloses a further drive unit, particularly for an electromotive automobile window lifter drive, in which the motor-gear shaft is supported on either side of a worm shaft portion that is located on the gear-case side. The motor-gear shaft is supported in each instance via a sliding bearing in the gear case. In addition, the free end of the motor-gear shaft, located on the motor-housing side, provides an overhung bearing arrangement for the electric motor.

OBJECTS OF THE INVENTION

A first object of the present invention is to simplify and facilitate the manufacture and, in particular, the assembly of motor-gear drive units, such as automobile window lifter drives and the like. A related, second object is to reduce the outlay for manufacturing and assembling such units substantially, thereby containing overall costs.

SUMMARY OF THE INVENTION

These and other objects are achieved by means of the teachings of independent claims 1 and 15. Particularly advantageous aspects and embodiments of the invention are the subject matter of the dependent claims.

A motor-gear drive unit according to the invention includes a motor housing and a gear case adjoining the motor housing. A motor-gear shaft projects from an orifice of the motor housing into the gear case. This motor-gear shaft is mounted in such a manner that it is supported in the motor housing in a first bearing and in the gear case in a second bearing. The second bearing is formed as a cylindrical, preferably metallic bearing. The gear case consists essentially of a plastic part having an axially loadable bearing orifice with circumferential, radially projecting shaped webs for receiving the cylindrical bearing. The cylindrical bearing is pressed axially into the bearing orifice so as to achieve a press fit relative to the shaped webs.

The inventive subject matter renders it possible to utilize a cylindrical bearing, instead of a cup bearing, in conjunction with a plastic gear case. The plastic gear case is far preferable to other types of cases, particularly in terms of ease of manufacturing and in terms of cost containment. Moreover, a cylindrical bearing is simple to produce and to assemble. It can be securely positioned and fixed by being pressed axially into an appropriate bearing receptacle located on the gear case side. Even if the cylindrical bearing is made of metal, the press-fitting according to the invention does not give rise to undesirable stress overloads with respect to either the bearing itself or the bearing receptacle, even taking into account maximum coefficients of thermal expansion of the metallic bearing on the one hand and of the plastic injection-molded gear case on the other hand.

By having the outer circumference of the cylindrical bearing bear on the radially projecting shaped webs having free spaces located between them, as defined by the invention, at least the following two advantages are achieved. First, it is possible, when using a standard cylindrical bearing, to achieve a high pressing force that is even capable of compensating for thermal expansions. Conversely, if, as a result of mass-production, overtolerances or thermal loads arise, it is nonetheless possible to prevent excessive stress on the cylindrical bearing itself or on the bearing orifice. This is so, in particular, because the radially projecting shaped webs can, to a small degree, escape resiliently into the free spaces located circumferentially between them.

According to a preferred embodiment of the invention, an additional and form-fitting axial, i.e., tangential, locking of the cylindrical bearing in its bearing orifice is provided for the final bearing arrangement, once assembled. More specifically, the invention provides for shaping axial stops out of the wall of the bearing orifice in the gear case after the cylindrical bearing has been pressed in. These stops can then, expediently, be pressed into circumferential groove-like depressions on the open axial end face of the cylindrical bearing. In this way, tangential rotation of the cylindrical bearing in the orifice is further prevented as a result of the positive, interlocking engagement of the bearing and the orifice.

BRIEF DESCRIPTION OF DRAWINGS

The invention and further associated aspects and advantages of the invention are explained in greater detail below by means of diagrammatically represented, exemplary embodiments in the drawing, in which.

DETAILED DESCRIPTION OF THE PREFERRED EMBODIMENTS

Figure 1:
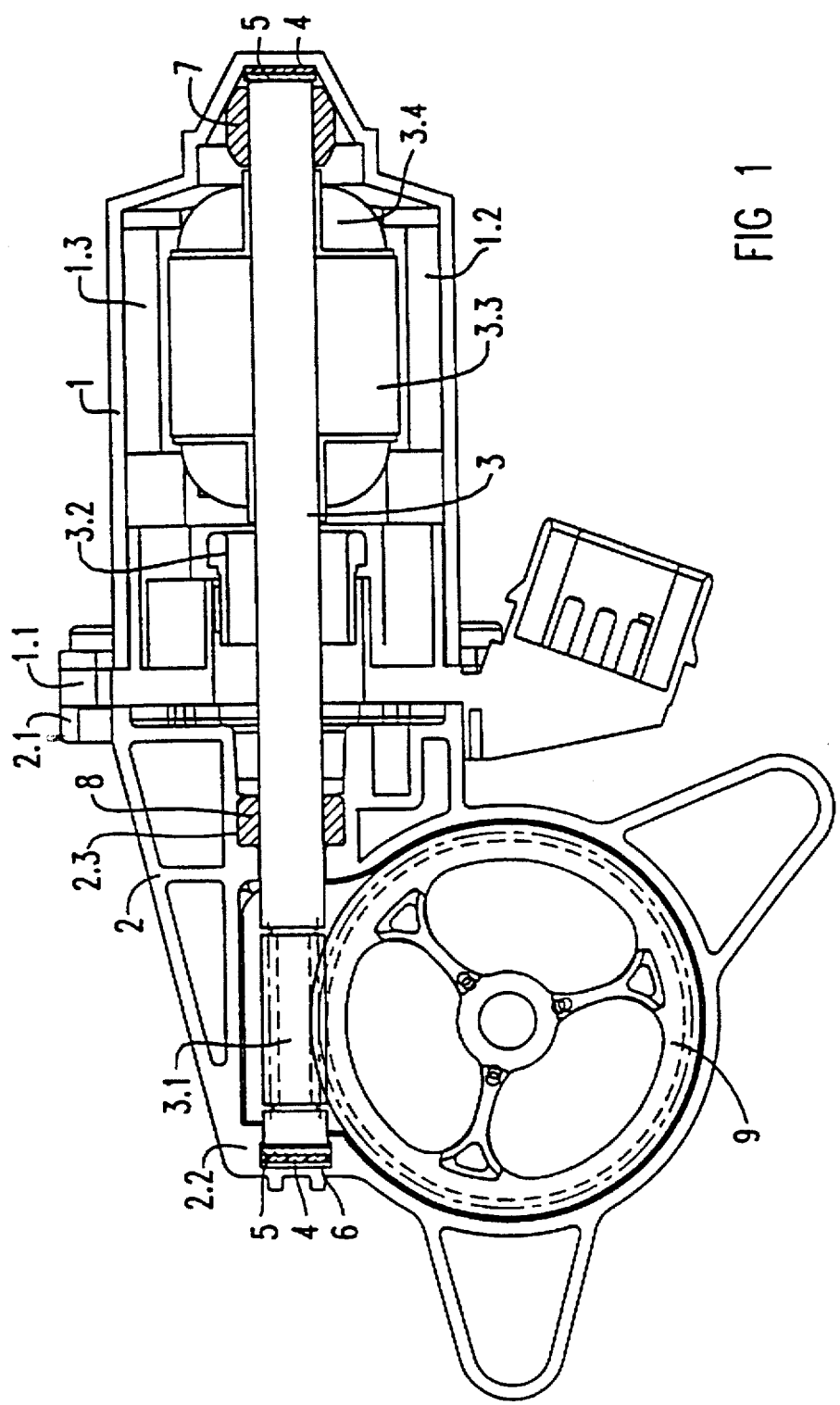
FIG. 1 shows an axial longitudinal section through a motor-gear drive unit for an automobile window lifter drive.
Figure 2:
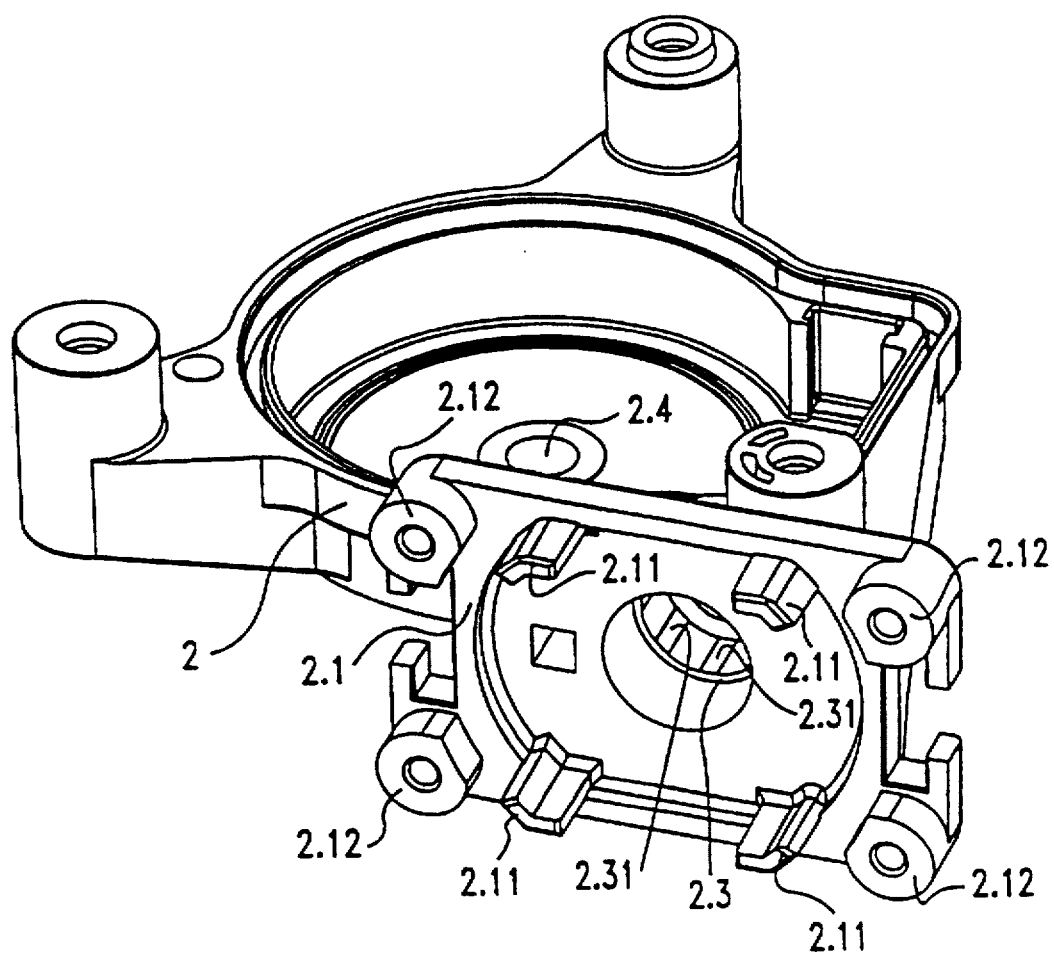
FIG. 2 shows a perspective representation of an unequipped gear case of the motor-gear drive unit according to FIG. 1.

FIG. 1 shows an axial longitudinal section through a motor-gear drive unit for an automobile window lifter drive with a pot-shaped motor housing 1. A gear case 2, injection-molded from plastic, is fastened to an end flange 1.1 of the motor housing 1 by means of a corresponding end flange 2.1. As best illustrated in FIG. 2, the gear case 2 has a plurality of guide webs 2.11, injection-molded in a simple manner onto the end flange 1.1, for facilitating assembly of the motor housing 1 to the gear case 2. During the assembly, the motor housing 1 is guided along the guide webs 2.11 toward the end flange 2.1, and, in its end position, is screwed to fastening lugs 2.12 provided on the gear-case side.

A motor-gear shaft 3 is mounted within the motor housing 1 and the gear case 2. More particularly, a rightward extending end of the shaft 3 is mounted in a shaft bearing 7 located on the motor housing side. The shaft bearing 7 is preferably provided by a cup bearing. A middle shaft bearing 8, formed preferably as a cylindrical bearing, supports the shaft 3 on the gear case side, towards the left-hand side. The shaft 3, however, overhangs the cylindrical bearing 8 in the leftward direction, and thus has a free shaft end extending beyond the cylindrical bearing 8. This free shaft end is provided with a worm shaft 3.1, which meshes with an output-side worm wheel 9. Exciter magnets 1.2, 1.3 are mounted around the circumference of the pot-shaped motor housing 1. The right-hand portion of the motor-gear shaft 3, extending through the motor housing 1, engages with a rotor assembly 3.3. The rotor assembly 3.3., the details of which are not shown in greater detail, has a rotor winding 3.4 wound therein and is connected to a commutator 3.2.

FIG. 2 shows a perspective representation of the gear case 2, as yet unequipped and not yet closed by means of a gear case cover. Axially projecting guide webs 2.11 are injection-molded on the end flange 2.1, for facilitating the guided assembly of the motor housing 1. Also provided on the end flange 2.1 are fastening lugs 2.12, to which the motor housing 1 can be screwed by means of its end flange 1.1. The gear case 2 additionally has a receptacle 2.4, which is configured to support a worm wheel axle, on which the worm wheel 9 shown in FIG. 1 can be mounted.

For the purpose of ensuring a definite axial play of an amount 'a' for the motor-gear shaft 3, an elastic, disk-shaped run-on part 4 is provided axially, in front of each end face of the motor-gear shaft 3. The run-on parts 4 press axially onto the end faces of the motor-gear shaft 3, yet indirectly, because a dimensionally stable supporting washer 5 is interposed therebetween. On their opposite faces, the run-on parts 4 are supported on the motor housing 1 and on the gear case 2 respectively, either directly, as illustrated at the right shaft end in FIG. 1, or indirectly via a further dimensionally stable supporting washer 6, as illustrated at the left shaft end in FIG. 1. Each elastic disk-shaped run-on part 4 possesses a certain deformation spring characteristic such that, over a spring excursion corresponding to a specific maximum axial play, the pressing force is virtually constant and relatively low, yet thereafter rises sharply, in effect providing an inelastic stop limitation.

Figure 3:
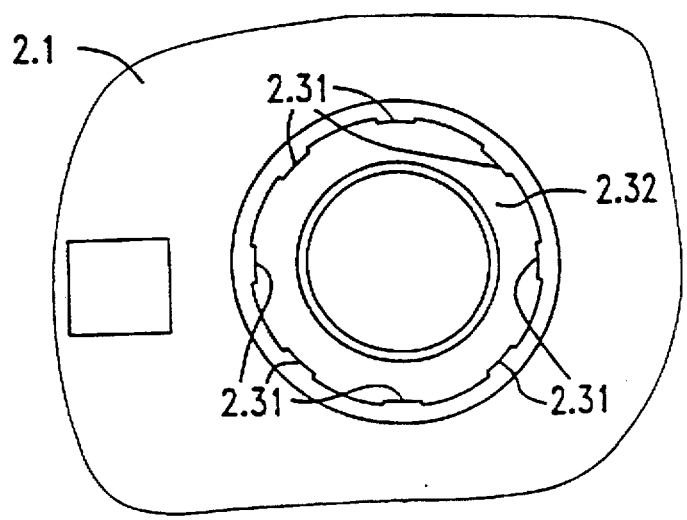
FIG. 3 shows, in an enlarged representation of a detail from FIG. 2, the axial top view of a bearing orifice provided for receiving an associated cylindrical bearing.
Figure 4:
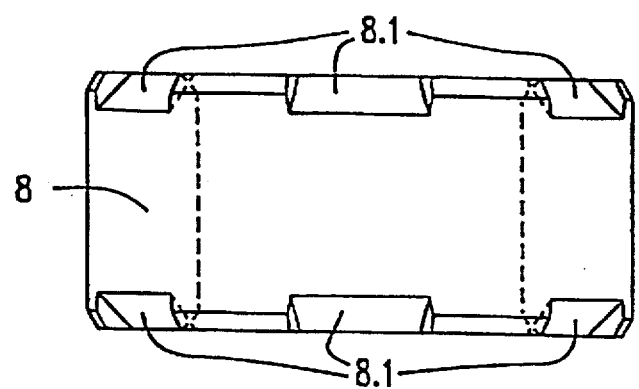
FIG. 4 shows, in an enlarged representation, a side view of a cylindrical bearing to be pressed axially into a bearing orifice as illustrated in FIG. 3.
Figure 5:
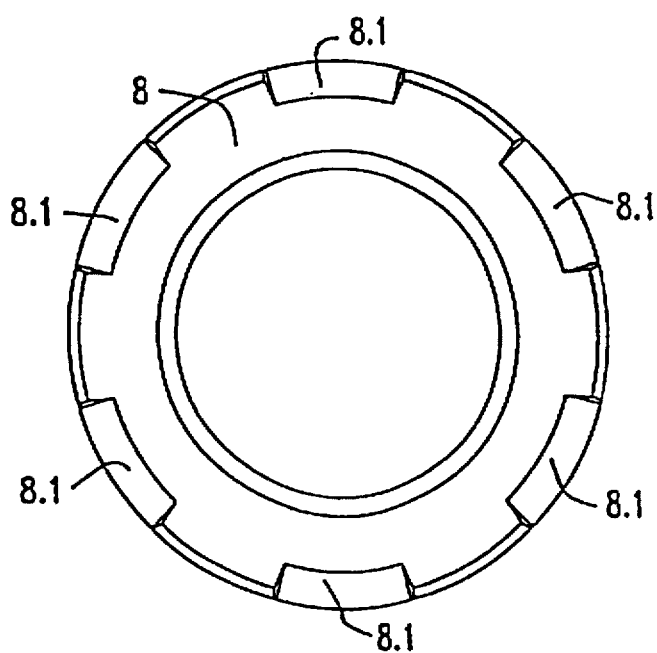
FIG. 5 shows a top view of the end face of the cylindrical bearing shown in FIG. 4.

The cylindrical bearing 8 can be assembled, according to the invention, in a particularly simple way and, at the same time, in a manner capable of being fixed securely in the gear case 2. More particularly, as is evident, e.g., from FIGS. 2 and 3, a bearing orifice 2.3 is molded into the gear case 2 and is axially loadable from the motor-housing side. The circumference of the bearing orifice 2.3 has radially inwardly projecting shaped webs 2.31 with free spaces located between them. The cylindrical bearing 8, shown in greater detail in FIGS. 4 and 5, is provided with a certain radial oversize relative to the radial spacing of the shaped webs 2.31. The cylindrical bearing 8 is then inserted axially and press-fitted into the bearing orifice 2.3, until the cylindrical bearing 8 comes to rest against a bearing shoulder 2.32. Undesirable pressure overloads on either or both the cylindrical bearing 8 or the wall of the bearing orifice 2.3 can be avoided in that the material of the shaped webs 2.31 is slightly deformable and can, if necessary, escape to a small degree into the free spaces located circumferentially between the shaped webs 2.31.

Figure 6:
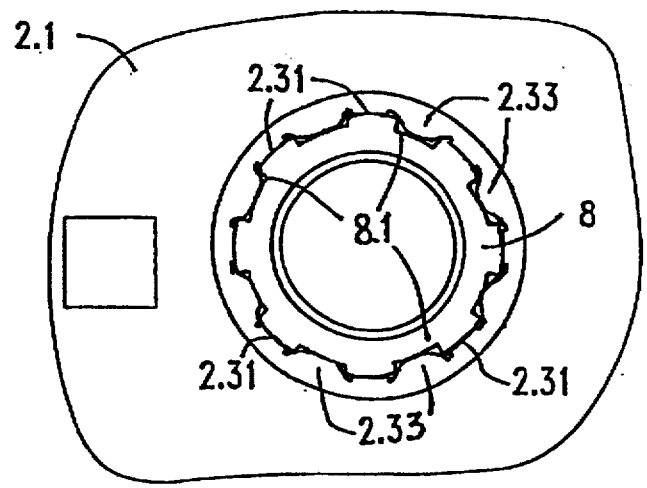
FIG. 6 shows an axial top view of a bearing orifice following insertion and securing of a cylindrical bearing.- Page

The present invention additionally provides a means not only for axially securing the cylindrical bearing 8 in the counterinsertion direction, but also for providing additional prevention against rotation. As shown in FIG. 6, after the cylindrical bearing 8 has been pressed into the orifice 2.3, the wall of the bearing orifice 2.3 may be deformed to a slight degree on the end face of the orifice that faces the motor housing 1, i.e., on the face corresponding to the press-in side. As a result, axial stops 2.33 are formed, which abut against the free end face of the cylindrical bearing 8. The deformation can be effected, in particular, by means of hot calking through ultrasonic welding. A method for axially securing bearing contacts by hot calking a bearing bracket housing a cylindrical bearing is known, for example, from EP-0 222 107 (B1); see in particular FIGS. 5 and 6 of that reference.

As is evident particularly from FIGS. 4 and 5, according to one embodiment of the invention, groove-like depressions 8.1 are provided around the circumference of the cylindrical bearing 8, at least on the end face of the bearing 8 facing away from the push-in direction. Accordingly, the tab-like stops 2.33 fashioned through deformation of the wall of the bearing orifice 2.3 mold into corresponding groove-like depressions 8.1. The arrangement according to this embodiment thereby provides a further means of preventing both axial displacement and rotation of the cylindrical bearing 8 in its bearing orifice 2.3.

What is claimed is:

1. A motor-gear drive unit, comprising:
   a motor housing;
   a gear case adjoining said motor housing; and
   a motor-gear shaft projecting from an orifice of said motor housing into said gear case; wherein
   said motor-gear shaft is mounted in said motor housing in a first bearing;
   said motor-gear shaft is mounted in said gear case in a second bearing in the form of a cylindrical bearing;
   said gear case consists essentially of a plastic part having an axially loadable bearing orifice with circumferential, plastic radially projecting shaped webs for securing said cylindrical bearing; and
   said cylindrical bearing is pressed into the bearing orifice axially in bearing contact with a press fit relative to said shaped webs.

2. The motor-gear drive unit as claimed in claim 1, wherein said motor-gear drive unit is an automobile window lifter drive.

3. The motor-gear drive unit as claimed in claim 1, wherein said first bearing is a cup bearing.

4. The motor-gear drive unit as claimed in claim 1, wherein said cylindrical bearing is positively fixed axially in the press-in direction by bearing on a shoulder of the bearing orifice.

5. The motor-gear drive unit as claimed in claim 1, wherein said cylindrical bearing is positively fixed axially in the counter press-in direction by bearing on at least one stop formed out of the wall defining the bearing orifice after said cylindrical bearing has been pressed in.

6. The motor-gear drive unit as claimed in claim 4, wherein said cylindrical bearing is positively fixed axially additionally in the counter press-in direction by bearing on at least one stop formed out of the wall defining the bearing orifice after said cylindrical bearing has been pressed in.

7. The motor-gear drive unit as claimed in claim 1, wherein said cylindrical bearing is provided with a plurality of groove-like depressions spaced around a circumference of said cylindrical bearing.

8. The motor-gear drive unit as claimed in claim 7, wherein said groove-like depressions extend into an end face of said cylindrical bearing.

9. The motor-gear drive unit as claimed in claim 5, wherein:
   said cylindrical bearing is provided with a plurality of groove-like depressions spaced around a circumference of said cylindrical bearing; and
   said stops formed out of the wall defining the bearing orifice engage said groove-like depressions for further preventing rotation of said cylindrical bearing in the bearing orifice.

10. The motor-gear drive unit as claimed in claim 5, wherein said stops are formed out of the wall of the bearing orifice by a calking or shearing operation.

11. The motor-gear drive unit as claimed in claim 5, wherein said stops are formed out of the wall of the bearing orifice by hot calking.

12. The motor-gear drive unit as claimed in claim 11, wherein said stops are formed out of the wall of the bearing orifice by ultrasonic welding.

13. The motor-gear drive unit as claimed in claim 1, wherein:
   said cylindrical bearing is arranged in a part of said gear case located near said motor housing;
   said motor-gear shaft has a gear-side end projecting into said gear case beyond said cylindrical bearing; and
   said gear-side end of said motor-gear shaft is provided with a worm shaft toothing.

14. The motor-gear drive unit as claimed in claim 1, wherein said second bearing is a metallic bearing.

15. A motor-gear drive unit, comprising:
   a motor housing;
   a plastic gear case adjoining and affixed to said motor housing;
   a motor-gear shaft extending into said motor housing and said gear case through respective orifices provided in said motor housing and in said gear case; and
   means for mounting said motor-gear shaft, said mounting means comprising a first bearing in said motor housing and a second, metallic, substantially cylindrical bearing in said gear case;
   wherein the orifice provided in said gear case has a plurality of shallow, plastic, radially inwardly projecting tabs provided around a circumference of the orifice, and
   wherein said second bearing is press-fitted into the orifice provided in said gear case, such that said tabs press against and secure said second bearing to provide the press-fit.

16. The motor-gear drive unit as claimed in claim 15, wherein the orifice provided in said gear case has at least one abutment ledge restricting axial movement of said second bearing in at least one axial direction.

17. The motor-gear drive unit as claimed in claim 16, wherein:
   said second bearing is provided with at least one groove-like depression; and
   said at least one abutment ledge engages said at least one groove-like depression, restricting rotational movement of said second bearing in the orifice.

18. The motor-gear drive unit as claimed in claim 1, wherein:
   said motor-gear shaft is mounted in said gear case solely in said second bearing at an intermediate portion between a gear-side end and a motor-side end of said motor-gear shaft; and
   said gear-side end of said motor-gear shaft is a free shaft end unsupported by a bearing.

* * * * *

(12) EX PARTE REEXAMINATION CERTIFICATE (5101st)
United States Patent
Klingler

(10) Number: US 5,747,903 C1
(45) Certificate Issued: Apr. 26, 2005

(54) MOTOR-GEAR DRIVE UNIT, PARTICULARLY FOR AN AUTOMOBILE WINDOW LIFTER DRIVE OR THE LIKE, IN WHICH A MOTOR-GEAR SHAFT IS MOUNTED

(75) Inventor: Peter Klingler, Neubrunn (DE)

(73) Assignee: Siemens Aktiengesellschaft, Munich (DE)

Reexamination Request:
No. 90/006,064, Jul. 20, 2001

Reexamination Certificate for:
Patent No.: 5,747,903
Issued: May 5, 1998
Appl. No.: 08/701,956
Filed: Aug. 23, 1996

(30) Foreign Application Priority Data

Aug. 25, 1995 (DE) ...................................... 295 13 700 U

(51) Int. Cl.$^7$ ........................... H02K 7/116; H02K 5/16
(52) U.S. Cl. ........................ 310/75 R; 310/90; 310/91; 310/83; 310/89; 310/43
(58) Field of Search ................................ 310/75 R, 83, 310/89, 90, 96, 98, 99, 43; 384/215, 220, 222, 439, 192; 74/89.14, 425

(56) References Cited

U.S. PATENT DOCUMENTS 5,325,736 A   7/1994   Tsujita .......................... 74/425

FOREIGN PATENT DOCUMENTS

JP   U-6-44364   6/1994
JP   U-6-74074   10/1994

*Primary Examiner*—Tran Nguyen

(57) ABSTRACT

To reduce the outlay in terms of manufacture and assembly, a motor-gear drive unit is provided, which includes a motor housing and adjoining gear case, and in which:

a) a motor-gear shaft (3) is mounted in the motor housing (1) in a first bearing, preferably a cup bearing (7);

b) the motor-gear shaft (3) is mounted in the gear case (2) in a second bearing in the form of a preferably metallic, cylindrical bearing (8);

c) the gear case (2) consists of a plastic part with an axially loadable bearing orifice (2.3) having circumferentially radially projecting shaped webs (2.31) for receiving the cylindrical bearing (8); and d) the cylindrical bearing (8) is pressed into the bearing receptacle (2.3) axially in bearing contact with a press fit relative to the shaped webs (2.31).

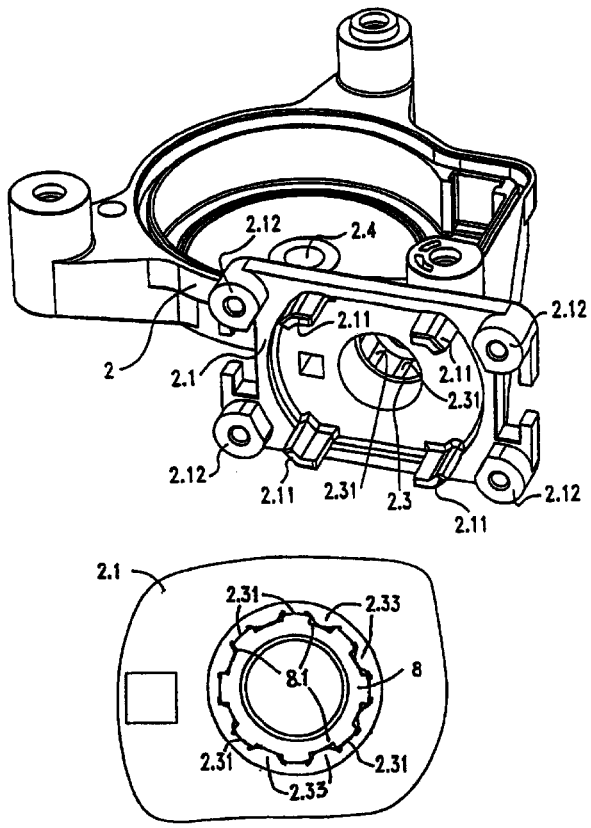

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 5–12, 16 and 17–18 is confirmed.

Claims 1–4 and 13–15 are cancelled.

\* \* \* \* \*